Sept. 2, 1969  D. L. SCHAFFNER  3,464,512
CUSHIONED EQUALIZER BEAM FOR CRAWLER TRACTOR
Filed May 29, 1968  2 Sheets-Sheet 1

Inventor
Donald L. Schaffner
By Charles L. Schwab
Attorney

Sept. 2, 1969  D. L. SCHAFFNER  3,464,512
CUSHIONED EQUALIZER BEAM FOR CRAWLER TRACTOR
Filed May 29, 1968  2 Sheets-Sheet 2
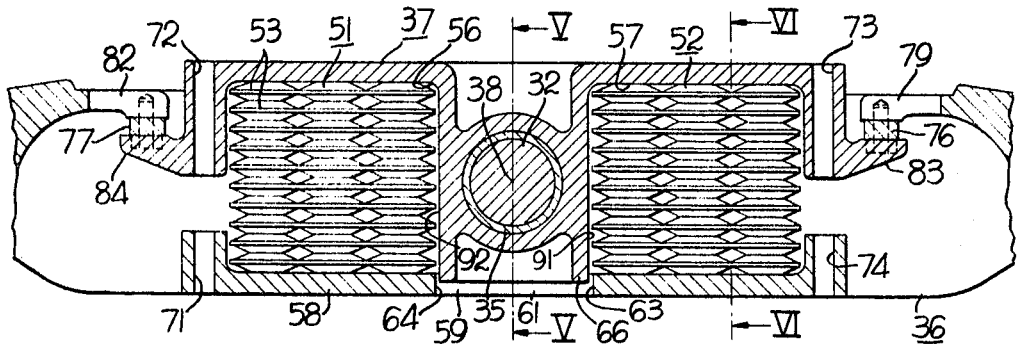
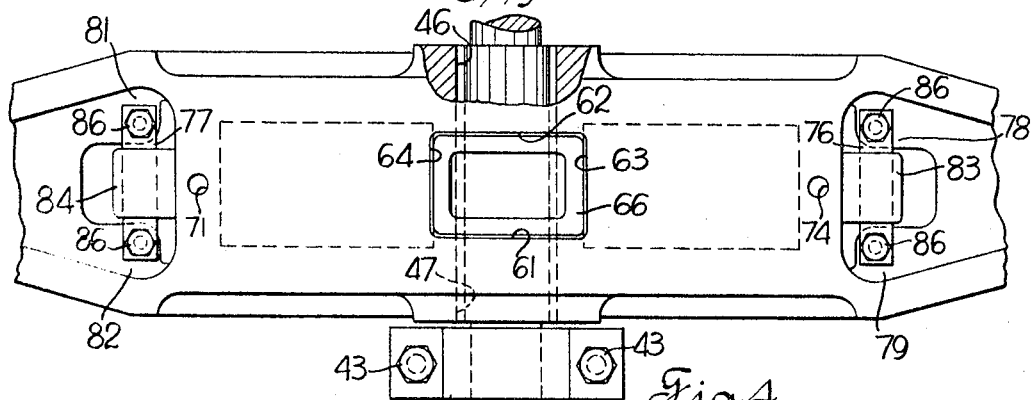
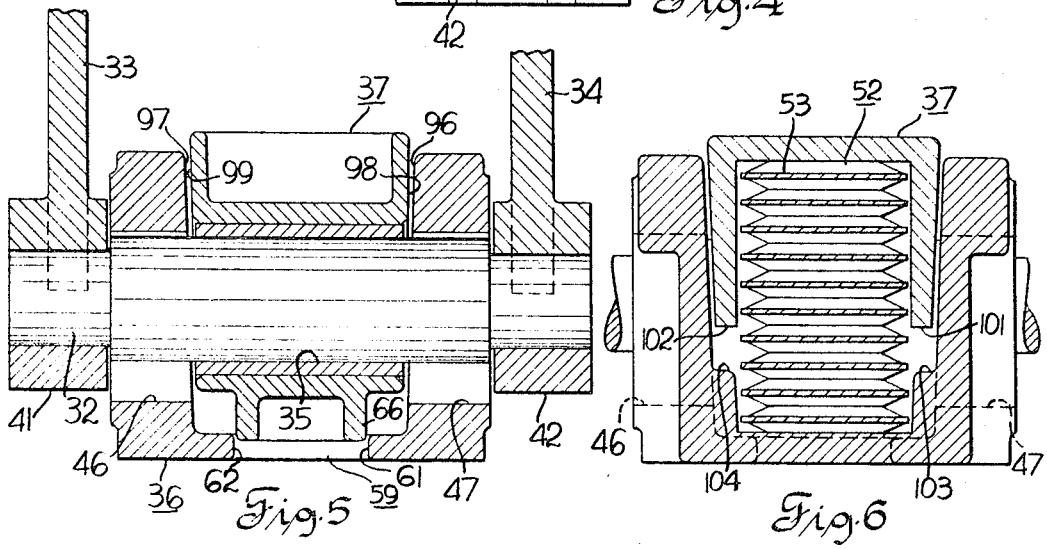
Inventor
Donald L. Schaffner
By Charles E. Schwab
Attorney

United States Patent Office 3,464,512
Patented Sept. 2, 1969

3,464,512
CUSHIONED EQUALIZER BEAM FOR CRAWLER TRACTOR
Donald L. Schaffner, Springfield, Ill., assignor to Allis-Chalmers Manufacturing Company, Milwaukee, Wis.
Filed May 29, 1968, Ser. No. 733,092
Int. Cl. B62d 55/00
U.S. Cl. 180—9.54                                                6 Claims

ABSTRACT OF THE DISCLOSURE

An equalizer mechanism for a crawler tractor having cushioning means between upper and lower parts thereof. The lower part serves as a rigid equalizer beam between the track frames and the upper part is pivotally connected by a longitudinal pivot pin to the tractor main body.

---

This invention relates to an equalizer mechanism for a crawler tractor which provides cushioned support for the tractor main frame.

Heretofore, others have provided equalizer mechanisms of various types for crawler tractors, some of which are rigid and some of which are cushioned. These prior art equalizer mechanisms have not always been satisfactory from a space requirement standpoint. Also, these prior devices have not been entirely satisfactory from a functional or performance standpoint. It is desirable in providing a equalizer mechanism that a minimum vertical space be required so that engine supporting main frame may be relatively close to the ground to provide a low center of gravity for the tractor. At the same time, it is desirable that the equalizer mechanism not be so low to the ground as to adversely affect under-tractor clearance. A cushioned equalizer reduces shock loading of parts, reduces wear, provides a more comfortable ride and reduces noise.

It is a main object of this invention to provide an improved equalizer mechanism incorporating cushioning means to provide improved tractor operating characteristics.

It is a further object of this invention to provide a cushioned equalizer mechanism which requires a minimum vertical space so as not to adversely affect the center of gravity or ground clearance.

It is a further object of this invention to provide an equalizer mechanism which is made up of upper and lower parts with cushioning means interposed therebetween.

It is a further object of the present invention to provide a two-part equalizer mechanism of the type hereinbefore outlined wherein means are provided to maintain such parts in assembly independently of the pivot pin connecting the mechanism to the tractor main frame.

These and other objects and advantages of the present invention will be apparent to those familiar with the art when the following description is read in conjuction with the drawings in which:

FIG. 3 is a transverse vertical section through the equalizer mechanism of the present invention;

FIG. 4 is a bottom view of the equalizer mechanism shown in FIG. 3;

FIG. 5 is a section view taken along the line of V—V in FIG. 3; and

FIG. 6 is a section view taken along the line VI—VI in FIG. 3.

Figure 1:
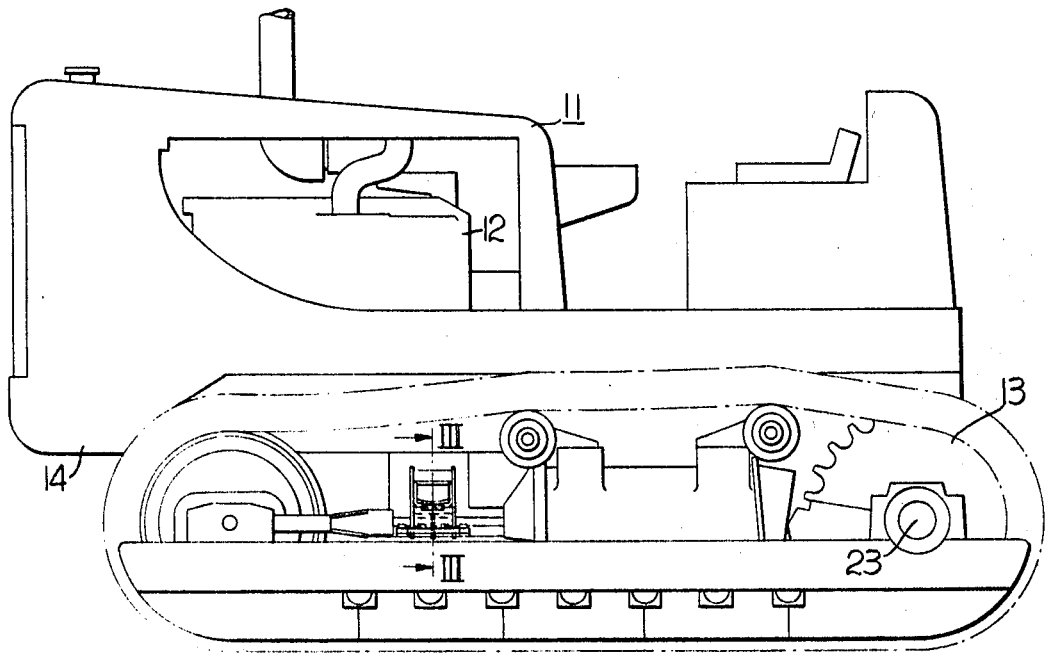
FIG. 1 is a side view of a crawler tractor incorporating the present invention.
Figure 2:
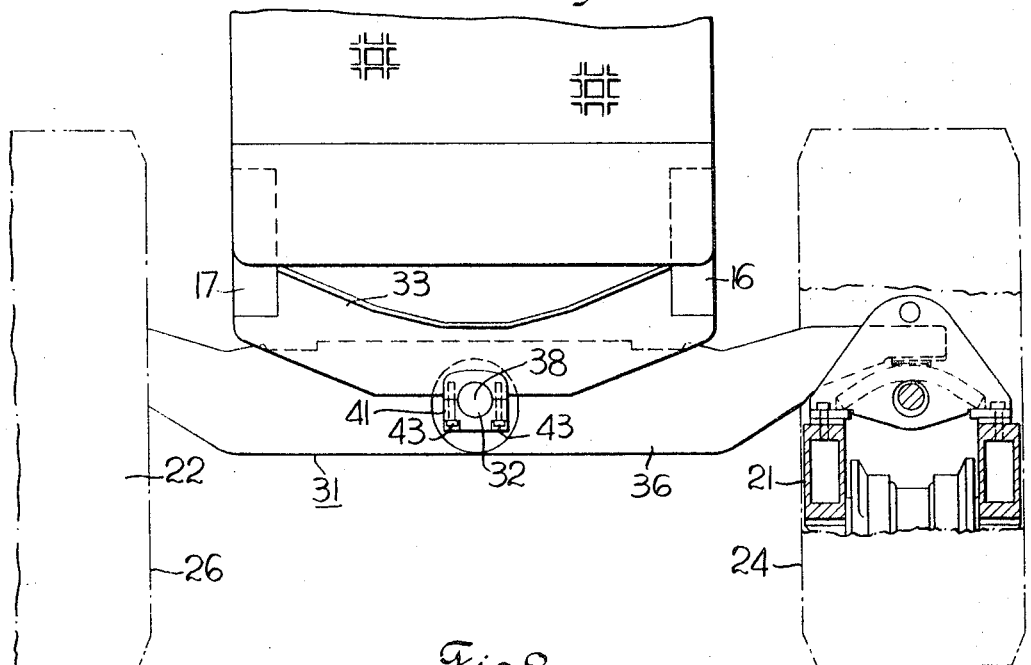
FIG. 2 is a front view of the tractor shown in FIG. 1.

Referring to FIGS. 1 and 2, the present invention is illustrated in a crawler tractor 11 having an engine 12 which is connected through a power train, not shown, to a pair of drive sprockets 13, only one of which is illustrated. The engine 12 is mounted on the main frame 14 of the crawler tractor 11, such main frame including a pair of longitudinal frame components 16, 17. A pair of track frames 21, 22 are pivotally supported on the main frame 14 on the axis 23 of the drive sprockets 13. The track frames 21, 22 carry a pair of endless tracks 24, 26 which are driven by the sprockets 13. The vertically swinging track frames and main frame are interconnected by an equalizer mechanism 31 which is pivotally connected through a longitudinal pin member 32 to a pair of transversely extending transverse braces 33, 34 as illustrated in FIGS. 2 and 5. The equalizer mechanism 31 includes an equalizer beam 36 whose opposite ends are supported on the track frames in the manner shown for one end in FIG. 2.

Referring to FIGS. 3 through 6, the equalizer mechanism includes, in addition to the equalizer beam 36, a transverse intermediate member 37 which is pivotally mounted on the central portion of pin member 32 for relative pivotable movement about the longitudinal axis 38 of the pin member 32. The longitudinal pin member 32 is rigidly secured to the braces 33, 34 by releasable fastening means including caps 41, 42 secured to braces 33, 34 by cap screws 43. The equalizer beam has a lost motion connection in the vertical direction with both the pin member 32 and the intermedaite member 37. The lost motion connection between the equalizer beam and the pin member 32 is provided by a pair of longitudinally aligned openings 46, 47 which are elongated in the vertical direction. Since the pin member 32 is secured for vertical movement with intermediate member 37, the lost motion movement between the equalizer beam 36 and the pin member 32 will also be lost motion movement relative to the intermediate member 37.

Cushioning for the equalizer mechanism is provided by compression spring means 51, 52 disposed between the intermediate member 37 and the equalizer beam at laterally opposite sides of pin member 32. Each of the compression spring means 51, 52 is comprised of stacked rubber cushions 53. Each cushion 53 consists of a central metal plate with three rubber-like cushion pads bonded to its upper and lower sides. The cushioning means 51, 52 are disposed in pockets at laterally opposite sides of the pin member 32, which are formed by downwardly opening cavities 56, 57 in intermediate member 37, and rest on a bottom wall 58 which is interrupted centrally by an opening 59. The vertical surfaces 61, 62, 63, 64 guidingly receive a central pin supporting part 66 of the intermediate member 37.

In order to initially assemble the two parts of the equalizer mechanism, namely intermediate member 37 and equalizer beam 36, the two stacks of cushioning means 51, 52 are placed in the cavities 56, 57 and bolts are installed in the openings 71, 72, 73, 74. Nuts are placed on the bolts and tightened to draw the intermediate member 37 and equalizer beam toward one another until releasable fastening means in the form of locking plates 76, 77 can be installed intermediate horizontal flanges 78, 79, 81, 82 of the equalizer beam 36 and laterally extending ears 83, 84 on the intermediate member. The locking plates 76, 77 are held in place by cap screws 86. In this assembled condition, the pin member 32 will pass through openings 46, 47 and through cylindrical bearing member 35 of the intermediate member 37. The equalizer mechanism may then be placed in position for attaching the ends of the pin member 32 to the braces 33, 34 by caps 41, 42 and cap screws 43.

It will be noted that the transverse position of equalizer beam 36 relative to intermediate member 37 is maintained by the sliding engagement between a pair of vertical walls 91, 92 on part 66 and surfaces 63, 64 of opening 59 in the equalizer beam and by the sliding engagement of pin member 32 with the side walls of openings 46, 47. The equalizer beam is positioned in the longitudinal direction (in the direction of axis 38) by cooperating sliding engagement between vertical walls 96, 97 on the equalizer beam and confronting vertical walls 98, 99 on the intermediate member. Upwardly movement of the equalizer beam relative to the intermediate member is limited by abutments 101, 102 on the intermediate member 37 engaging abutments 103, 104 on the equalizer beam. Downward movement of the equalizer beam relative to the intermediate member 37 is limited by the locking plates 76, 77.

From the foregoing description, it is apparent that an extremely novel and useful cushioned equalizer beam has been provided which requires a minimum of vertical space. It is also evident from the foregoing description and the drawings that the equalizer mechanism of the present invention is relatively easy to assemble and install, and is of sturdy design to give long trouble-free service. The cushioned equalizer mechanism of the persent invention provides a softer ride for the tractor and operator, thereby reducing operator fatigue, wear and failure of parts and operating noise. Care has been taken not to make the suspension so soft as to adversely affect the control of tools or attachments, such as a bulldozer.

The embodiments of the invention for which an exclusive property or privilege is claimed are defined as follows:

1. An equalizer mechanism for a crawler tractor of the type having a main frame disposed between a pair of transversely-spaced track frames supporting endless tracks, comprising:
   a longitudinal pivot pin member connected at longitudinally spaced points to said main frame,
   a transverse intermediate member mounted on said pin member intermediate said points,
   a transverse equalizer beam supported at its opposite ends on said track frames and having a lost motion connection in the vertical direction with at least one of said members, and
   compression spring means between said intermediate member and beam at laterally opposite sides of said pin member.

2. The invention of claim 1 wherein said equalizer beam has a lost motion connection with said pin member.

3. The invention of claim 2 wherein said equalizer beam has a pair of longitudinally spaced and transversely extending vertical side walls with longitudinally aligned openings through which said pin member extends.

4. The invention of claim 3 wherein said walls are disposed on longitudinally opposite sides of said intermediate member and between said points of connection between said pin member and main frame.

5. The invention of claim 2 and further comprising connecting means forming a lost motion connection between said intermediate member and equalizer beam for limited relative movement in the vertical direction.

6. The invention of claim 5 wherein said connecting means includes releasable fastening means maintaining said intermediate member and beam in assembled condition independently of said pin member.

References Cited

UNITED STATES PATENTS

| | | | |
|---|---|---|---|
| 1,806,819 | 5/1931 | Paulsen | 180—9.54 |
| 2,474,514 | 6/1949 | Burks | 180—9.6 |
| 3,010,530 | 11/1961 | Risk | 180—9.54 |

RICHARD J. JOHNSON, Primary Examiner